US012782761B2

(12) United States Patent
Kanazawa et al.

(10) Patent No.: US 12,782,761 B2
(45) Date of Patent: Nov. 3, 2026

(54) OPTICAL MODULATION MODULE AND OPTICAL TRANSMITTER

(71) Applicant: NTT, Inc., Tokyo (JP)

(72) Inventors: Shigeru Kanazawa, Musashino (JP); Takahiko Shindo, Musashino (JP); Yuta Ueda, Musashino (JP); Wataru Kobayashi, Musashino (JP)

(73) Assignee: NTT, Inc., Tokyo (JP)

( * ) Notice: Subject to any disclaimer, the term of this patent is extended or adjusted under 35 U.S.C. 154(b) by 398 days.

(21) Appl. No.: 18/569,799

(22) PCT Filed: Jul. 5, 2021

(86) PCT No.: PCT/JP2021/025356

§ 371 (c)(1),
(2) Date: Dec. 13, 2023

(87) PCT Pub. No.: WO2023/281603

PCT Pub. Date: Jan. 12, 2023

(65) Prior Publication Data

US 2024/0201522 A1 Jun. 20, 2024

(51) Int. Cl.
*G02F 1/015* (2006.01)

(52) U.S. Cl.
CPC .................................. *G02F 1/0157* (2021.01)

(58) Field of Classification Search
CPC ........ G02F 1/0157; G02F 1/2255; G02F 1/01; G02F 1/025; G02F 1/212
See application file for complete search history.

(56) References Cited

U.S. PATENT DOCUMENTS

2019/0107739 A1* 4/2019 Yamaji .................... G02F 1/015

FOREIGN PATENT DOCUMENTS

JP 2019-071402 A 5/2019

OTHER PUBLICATIONS

Shigeru Kanazawa, et al., *Flip-Chip Interconnection Lumped-Electrode EADFB Laser for 100-Gb/s/λ Transmitter*, IEEE Photon. Technol. Lett., vol. 27, No. 16, 2015, pp. 1699-1701.

* cited by examiner

*Primary Examiner* — Joseph P Martinez
(74) *Attorney, Agent, or Firm* — Workman Nydegger

(57) ABSTRACT

Provided are an optical transmitter that improve a signal path between the optical modulation module and a substrate, prevent deterioration of a modulated signal, and can obtain a signal in a wide frequency band. An optical transmitter of the present disclosure includes an optical modulation light source chip, an RF wiring substrate connected to the optical modulation light source chip, and an RF connection substrate having a metal bump connecting the optical modulation light source chip and the RF wiring substrate. The optical modulation light source chip is configured to include a semiconductor substrate, a semiconductor layer, a wiring layer connected to the semiconductor substrate and in contact with the metal bump, and a wiring layer connected to the semiconductor layer and in contact with the metal bump.

7 Claims, 15 Drawing Sheets

(a)

(b)

(a)

(b)

OPTICAL MODULATION MODULE AND OPTICAL TRANSMITTER

TECHNICAL FIELD

The present disclosure relates to an optical modulation module and an optical transmitter.

BACKGROUND ART

In recent years, in accordance with rapid growth of cloud services and wireless applications, data traffic increases exponentially. Thus, a higher data rate is required for Ethernet, and 100 gigabit ethernet (100 GbE) was standardized in 2010. A multi-lane interface having four lanes is adopted for a single mode fiber (SMF) application. However, an increase in the number of lanes in a multi-lane system is undesirable, and a single light source capable of performing modulation at 100 Gb/s is required to increase the data rate per single lane. Such a light source is described, for example, in Non Patent Literature 1. Non Patent Literature 1 describes a configuration in which a distributed feedback laser integrated with an electro-absorption modulator (EADFB laser) chip and a radio frequency (RF) circuit substrate are connected by a flip-chip interconnection board including a coplanar waveguide and a termination resistor. The flip-chip interconnection board includes a metal bump at a ground portion on a side of a signal line, and the metal bump connects the EADFB laser chip and the RF circuit substrate.

In the above configuration, the signal line of the RF circuit substrate is connected to the EADFB laser chip via the metal bump. On the other hand, the ground portion of the flip-chip interconnection board is connected to a ground portion on a side of the RF circuit substrate via the metal bump and is further connected to a ground electrode on a lower surface of the EADFB laser chip via a ground electrode on a subcarrier (the EADFB laser chip and a substrate under the RF circuit substrate).

CITATION LIST

Non Patent Literature

Non Patent Literature 1: S. Kanazawa et. al., "Flip-Chip Interconnection Lumped-Electrode EADFB Laser for 100-Gb/s/A Transmitter", IEEE Photon. Technol. Lett., vol. 27, no. 16, pp. 1699-1701, 2015.

SUMMARY OF INVENTION

However, a path of a signal in the configuration described in Non Patent Literature 1 passes through the ground portion of the subcarrier through the EADFB laser chip and is connected to the ground portion of the flip-chip interconnection board through the RF circuit substrate. Such a path is long to such an extent that it is difficult to handle the path as a lumped constant circuit in a frequency band exceeding 60 GHz, the band is deteriorated, and the path is not suitable for 85 Gbit/s signal transmission. The present disclosure has been made in view of such a problem, and an object thereof is to provide an optical modulation module and an optical transmitter that improve a signal path between the optical modulation module and a substrate, prevent deterioration of a modulated signal, and can obtain a favorable signal in a wide frequency band.

In order to achieve the above object, an optical module according to an aspect of the present disclosure is an optical modulation module having a first main surface and a second main surface facing the first main surface and connected to a wiring substrate by a connection substrate on a side of the first main surface, the optical modulation module including: a first-type semiconductor layer into which an impurity having a first polarity is injected; a second-type semiconductor layer into which an impurity having a second polarity different from the first polarity is injected; a first wiring layer electrically connected to the first-type semiconductor layer and in contact with a terminal of the connection substrate on the first main surface; and a second wiring layer electrically connected to the second-type semiconductor layer and in contact with the terminal on the first main surface.

An optical transmitter according to an aspect of the present disclosure includes the optical modulation module, a connection substrate disposed on a side of the first main surface of the optical modulation module, and a connection substrate having a terminal that electrically connects the optical modulation module and the connection substrate.

According to the above embodiment, it is possible to provide an optical transmitter and an optical modulation module that improve a signal path between the optical modulation module and the substrate, prevent deterioration of a modulated signal and can obtain a favorable signal in a wide frequency band.

DESCRIPTION OF EMBODIMENTS

First Embodiment

Figure 1:
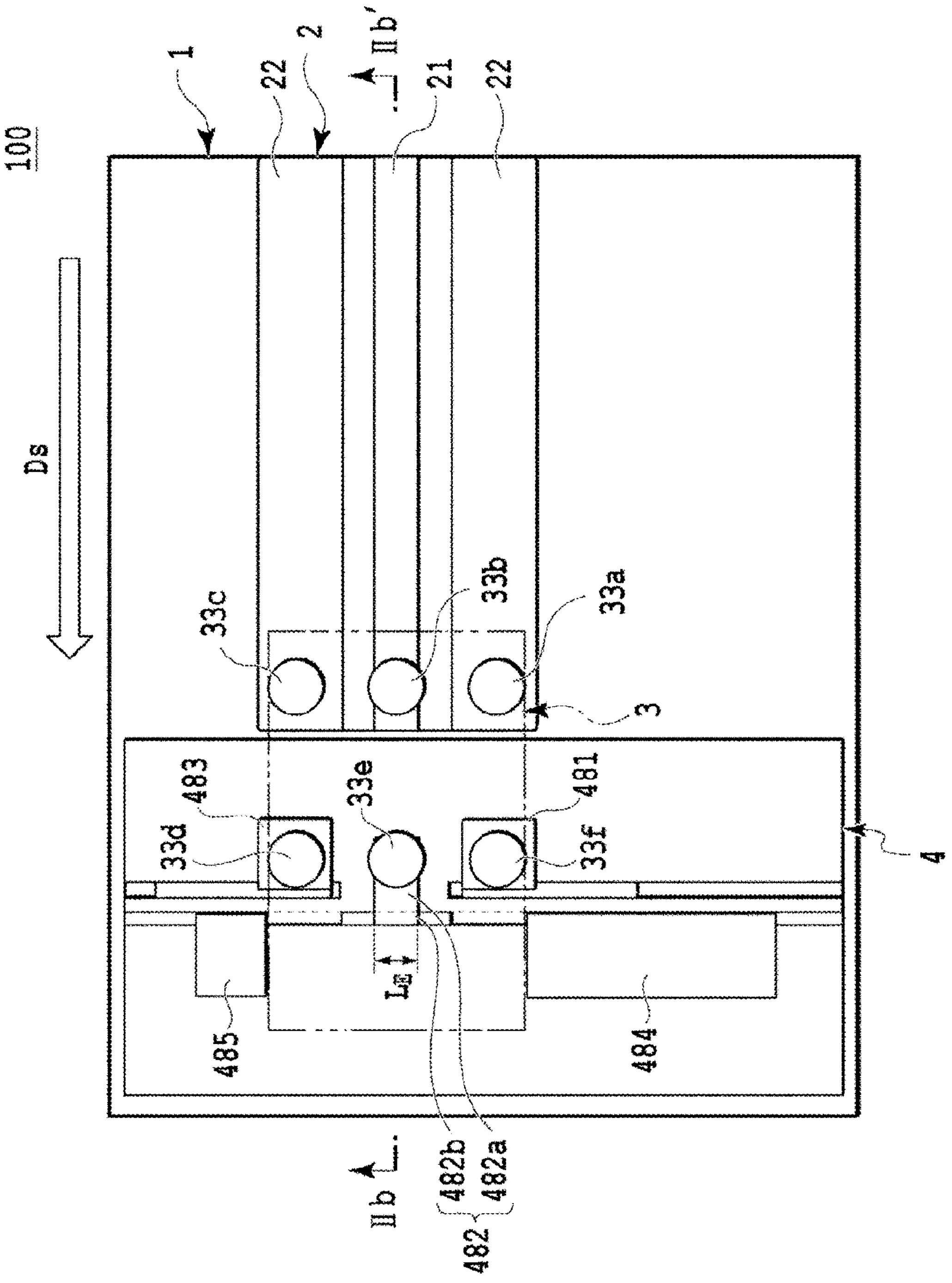
FIG. 1 is a top view of an optical transmitter according to a first embodiment.
Figure 2:
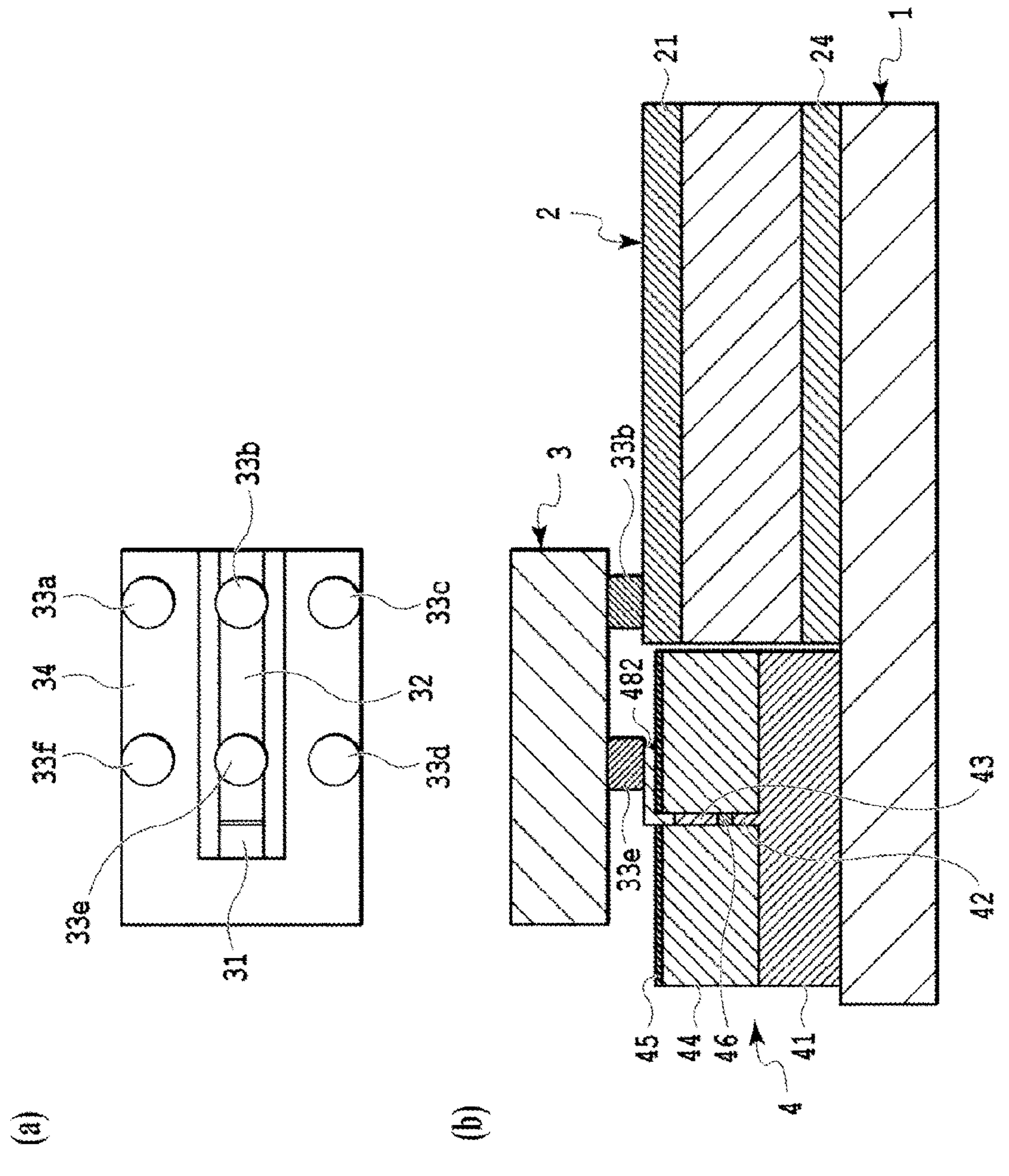
FIG. 2(*a*) is a view illustrating a lower surface of an RF connection substrate illustrated in FIG. 1, and FIG. 2(*b*) is a longitudinal cross-sectional view of the optical transmitter illustrated in FIG. 1.

FIGS. 1, 2(*a*), and 2(*b*) are schematic views for explaining an optical transmitter 100 according to a first embodiment of the present disclosure. FIG. 1 is a top view of the optical transmitter 100. FIG. 2(*a*) is a view illustrating a surface (hereinafter, referred to as a "lower surface") of an RF connection substrate 3 of the optical transmitter 100 on a side facing an optical modulation light source chip 4, and FIG. 2(*b*) is a cross-sectional view taken along lines IIb and IIb' in FIG. 1. The optical transmitter 100 includes the optical modulation light source chip 4 which is an optical modulation module, an RF wiring substrate 2 which is a wiring substrate connected to the optical modulation light source chip 4, and the RF connection substrate 3 which is a connection substrate having terminals for electrically connecting the optical modulation light source chip 4 and the RF wiring substrate 2. Here, the "optical modulation module" only needs to have a function of modulating input light while integrating a plurality of elements. The RF wiring substrate 2 and the RF connection substrate 3 may be any substrates that withstand use in high frequencies. The terminals of the RF connection substrate 3 are not particularly limited, but metal bumps are used in the first embodiment.

As illustrated in FIG. 2(*b*), the RF wiring substrate 2 and the optical modulation light source chip 4 are mounted on a subcarrier 1. In the description of the first embodiment and a second embodiment to be described later, a direction from the subcarrier 1 toward the RF connection substrate 3 is referred to as "upper" or "above", and a side from the RF connection substrate 3 toward the subcarrier 1 is referred to as "lower" or "below". Note that such a vertical direction is based on a relative positional relationship of the optical transmitter 100 and does not depend on a gravity direction. The RF connection substrate 3 is provided on the RF wiring substrate 2 and the optical modulation light source chip 4, and connects them. In FIG. 1, the RF connection substrate 3 is indicated by a broken line, and the RF wiring substrate 2 and the optical modulation light source chip 4 below the RF connection substrate 3 are illustrated.

The optical modulation light source chip 4 is, for example, an electro-absorption type optical modulator integrated (EADFB) laser in which optical semiconductor amplifiers are integrated, and includes a plurality of InP-based materials. The subcarrier 1 is a ceramic substrate, and aluminum nitride (AlN) and aluminum oxide (alumina: $Al_2O_3$) are used as ceramic materials. The RF wiring substrate 2 and the RF connection substrate 3 may be a ceramic substrate, a fluororesin substrate, a polyphenyl ether (PPE) substrate, or a composite material thereof. The RF wiring substrate 2 and the RF connection substrate 3 are provided with a conductor film on surfaces facing each other and lower surfaces on the opposite side. Hereinafter, such a configuration will be sequentially described.

(RF Wiring Substrate)

As illustrated in FIG. 1, the RF wiring substrate 2 includes a signal line portion 21 serving as a signal line, and two upper surface ground portions 22 arranged lateral to the signal line portion 21 with the signal line portion 21 put therebetween. The signal line portion 21 and the upper surface ground portion 22 are made of a conductor film. The signal line portion 21 transmits a signal in a direction indicated by an arrow Ds in the drawing. Such an RF wiring substrate 2 is a grounded coplanar waveguide in which a linear line is formed on a substrate body which is a plate-shaped dielectric. The conductor film on a lower surface of the RF wiring substrate functions as a lower surface ground portion 24 (FIG. 3(*b*)).

Figure 3:
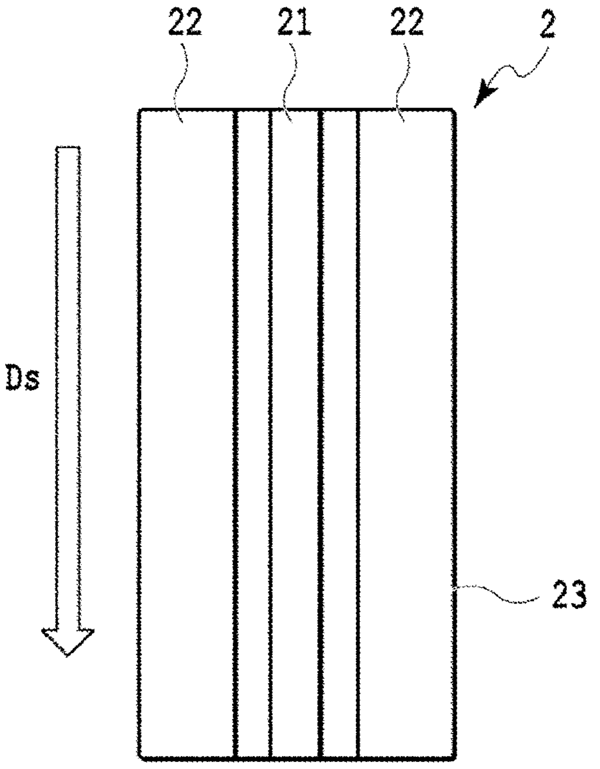
FIG. 3(*a*) is a view illustrating an upper surface of an RF wiring substrate, and FIG. 3(*b*) is a view illustrating signal flow in a coplanar waveguide.
Figure 3:
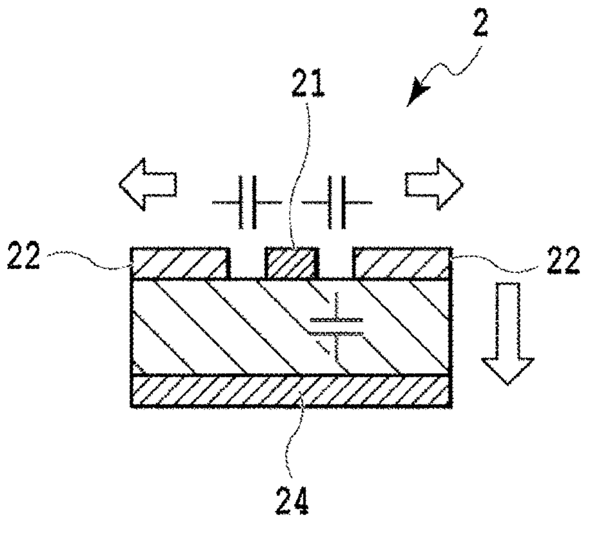

Here, the grounded coplanar waveguide will be described by taking the RF wiring substrate 2 as an example. FIGS. 3(*a*) and 3(*b*) are views for explaining a grounded coplanar waveguide, and FIG. 3(*a*) is a view illustrating an upper surface of the RF wiring substrate 2, which is the grounded coplanar waveguide, on which a wiring is formed. FIG. 3(*b*) is a schematic view for explaining flow of a signal in the grounded coplanar waveguide. In FIG. 3(*b*), a direction of an electric field from the signal line portion 21 toward the upper surface ground portion 22 is indicated by an arrow, and a direction of an electric field from the upper surface of the RF wiring substrate 2 toward the lower surface ground portion 24 is indicated by another arrow. In the grounded coplanar waveguide, electric field coupling between the signal line portion 21 and the upper surface ground portion 22 is stronger than electric field coupling between the signal line portion 21 and the lower surface ground portion 24, and the flow of the signal from the signal line portion 21 toward the ground portion is dominated by a path through the upper surface ground portion 22.

(RF Connection Substrate)

As illustrated in FIG. 2(*a*), the RF connection substrate 3 has a signal line formed on a surface of a plate-like substrate body. In the first embodiment, the signal line portion 32 and the lower surface ground portion 34 arranged on a side of the signal line portion 32 are formed on the surface (lower surface) of the RF connection substrate 3 on a side toward the RF wiring substrate 2 and the optical modulation light source chip 4. A termination resistor 31 is formed at an end portion of the signal line portion 32 to prevent disturbance due to signal reflection.

In addition, the RF connection substrate 3 includes six metal bumps 33*a*, 33*b*, 33*c*, 33*d*, 33*e*, and 33*f*. In the present specification, in a case where the metal bumps 33*a* to 33*f* are not distinguished from each other, the metal bump is also simply referred to as a "metal bump 33". The metal bumps 33*a* to 33*f* are all made of gold (Au). In the first embodiment, the RF connection substrate 3 is a grounded coplanar waveguide similarly to the RF wiring substrate 2. Thus, also in the RF connection substrate 3, the flow of the signal from the signal line portion 32 toward the ground is dominated by the path through the lower surface ground portion 34.

The number and arrangement of the metal bumps 33*a* to 33*f* are not limited to those described above. However, it is preferable that the metal bumps 33*a* to 33*f* are arranged in a direction intersecting with a direction in which the signal flows (the direction indicated by the arrow Ds). In the first embodiment, the metal bumps 33*a*, 33*b*, and 33*c* are arranged on a straight line and the metal bumps 33*f*, 33*e*, and 33*d* are arranged on a straight line so as to be orthogonal to the signal flowing direction. As described later, the plurality of electrodes connected to the metal bumps 33 of the optical modulation light source chip 4 are arranged such that the electrodes connected to semiconductor layers having different polarities of p-type and n-type intersect with the signal flowing direction and are alternately adjacent to each other. The metal bump 33 connects each of such electrodes to the signal line portion 21 or the upper surface ground portion 22.

With such a configuration, the RF connection substrate 3 electrically connects the optical modulation light source chip 4 and the RF wiring substrate 2.

In the above configuration, a signal input to the RF connection substrate 3 is divided into a path connected to the lower surface ground portion 34 via the termination resistor 31 and a path passing through the optical modulation light source chip 4 via the metal bump 33*e* and connected to the lower surface ground portion 34.

The RF connection substrate 3 and the RF wiring substrate 2 are designed as distributed constant lines, and an electrical path from the signal line portion 21 to the ground portion via the termination resistor 31 and the optical modulation light source chip 4 needs to be designed as a lumped constant circuit. In order to achieve design as a lumped constant circuit, it is necessary to make this path sufficiently short with respect to a signal wavelength so that a phase difference (deviation) from the signal passing through the path caused by capacitive coupling from the signal line portion 21 to the lower surface ground portion 34 does not increase.

(Optical Modulation Light Source Chip)

As illustrated in FIG. 2(*b*), the optical modulation light source chip 4 is mounted on the subcarrier 1 together with the RF wiring substrate 2. The optical modulation light source chip 4 includes a first-type semiconductor layer into which an impurity having a first polarity is injected and a second-type semiconductor layer into which an impurity having a second polarity different from the first polarity is injected. In the first embodiment, the first-type is n-type and the second type is p-type. Thus, as illustrated in FIG. 2(*b*), the optical modulation light source chip 4 includes an n-type semiconductor substrate 41, an n-type active layer 46, and a p-type semiconductor layer 43, and further includes a semi-insulating semiconductor layer 44, an insulating film 45, and a wiring layer 482 that do not contain impurities.

Projections 42 are formed on the n-type semiconductor substrate 41 by patterning. The active layer 46 is a waveguide of laser light in the optical modulation light source chip 4 and is formed with an n-type semiconductor. The wiring layer 482 is connected to the p-type semiconductor layer 43 and serves as a p-side electrode of the optical modulation light source chip 4. The metal bump 33*e* on the signal line portion 21 is connected to the wiring layer 482, and the wiring layer 482 and the signal line portion 21 are electrically connected. As illustrated in FIG. 1, a length of the wiring layer 482 in a direction intersecting with the arrow Ds is referred to as an electrode length $L_E$. Such an optical modulation light source chip 4 includes a laser chip, an amplifier, and an optical modulator (not illustrated), and amplifies, modulates, and outputs light emitted from the laser chip.

The n-type semiconductor substrate 41, the semi-insulating semiconductor layer 44, and the p-type semiconductor layer 43 are all InP-based semiconductors, and the active layer 46 contains Ga and As in addition to InP. Composition of the active layer 46 is represented as, for example, $In_{1-x}Ga_xAs_yP_{1-y}$. The n-type semiconductor substrate 41, the semi-insulating semiconductor layer 44, the active layer 46, the p-type semiconductor layer 43, and the insulating film 45 can all be formed by metal organic chemical vapor deposition (MOCVD). Electrical conductivity of each layer is set by concentration of a dopant contained in each layer. The wiring layer 482 is, for example, an Al wiring and is formed by sputtering, for example. Each of the above layers is patterned into a desired shape by known photolithography after being formed. The insulating film 45 is formed by, for example, depositing $SiO_2$, $Si_3N_4$, or the like.

Figure 4:
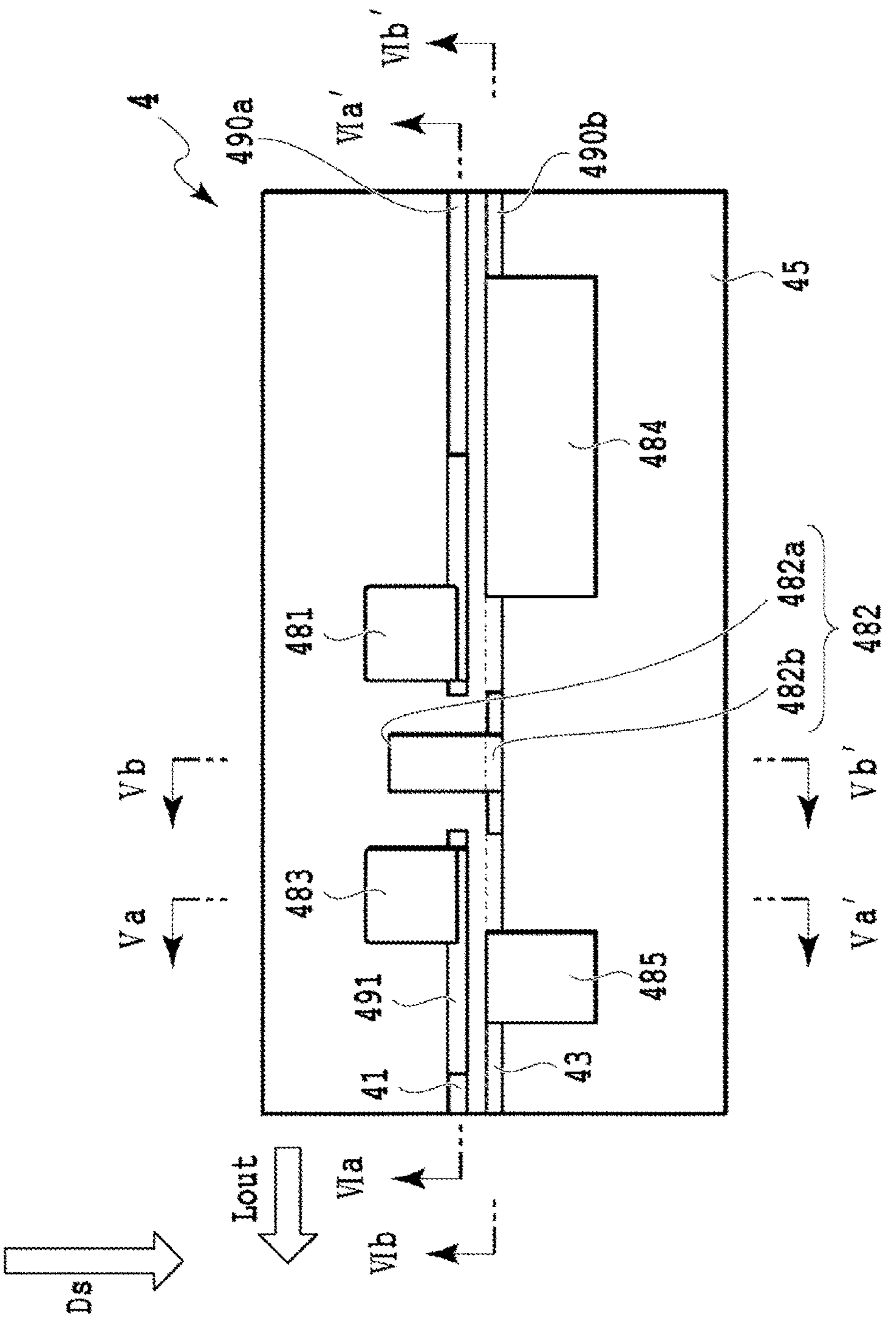
FIG. 4 is a top view of an optical modulation light source chip illustrated in FIG. 1.

FIG. 4 is a top view of the optical modulation light source chip 4. The optical modulation light source chip 4 of the first embodiment has an upper surface illustrated in FIG. 4 and a lower surface facing the upper surface. The upper surface and the lower surface are a first main surface and a second main surface of the optical modulation light source chip, respectively. Here, the main surface only requires to be a surface having a relatively large area in the optical modulation light source chip, and an area and a direction thereof are not limited. A light output direction of the optical modulation light source chip 4 is referred to as $L_{out}$ in FIG. 4.

On the surface of the optical modulation light source chip 4, an insulating film 45, wiring layers 481, 482, 483, 464, and 485, a p-side contact groove 490*b* for the wiring layer 482 to be in contact with the p-type semiconductor layer 43, and an n-side contact groove 490*a* for the wiring layers 481 and 483 to be in contact with the n-type semiconductor substrate 41 are formed. In the wiring layer 482, a portion having a wide width of the pattern is referred to as a wide portion 482*b*, and a portion having a relatively narrow width (length in a longitudinal direction of the optical modulation light source chip 4) is referred to as a narrow portion 482*a*.

The wiring layers 481 and 483 are n-side electrodes connected to the n-type semiconductor substrate 41 and serve as ground electrodes of an optical modulator mounted on the optical modulation light source chip 4. The wiring layer 482 connected to the signal line portion 21 is a p-side electrode of the optical modulator and receives a signal from the RF wiring substrate. The wiring layer 484 is a p-side electrode connected to the p-type semiconductor layer 43 and is connected to, for example, a laser chip of the optical modulation light source chip 4. The wiring layer 485 is a p-side electrode connected to the p-type semiconductor layer 43 and is connected to, for example, an amplifier of the optical modulation light source chip 4. The wiring layers 484, 482, and 485 serving as the p-side electrodes and the wiring layers 481 and 483 serving as the n-side electrodes are arranged so as to intersect with a transmission direction of the signal indicated by the arrow Ds and have different polarities from those of the adjacent wiring layers. With such a configuration, in the first embodiment, by limiting a range in which the p-side electrode and the n-side electrode are arranged and arranging both at a high density, it is possible to shorten a wiring length between the p-side electrode and the n-side electrode.

In addition, in the first embodiment, one wiring layer 482 serving as a p-side electrode and two wiring layers 481 and 483 serving as n-side electrodes are formed on the upper surface, and the wiring layers 481, 482, and 483 are adjacent to each other and alternately arranged on the upper surface. Furthermore, in the first embodiment, the wiring layers 481 and 483 are arranged with the wiring layer 482 put therebetween in a planar direction of the upper surface. However, the first embodiment is not limited to such a configuration, and a plurality of wiring layers each serving as a p-side electrode and a plurality of wiring layers each serving as an n-side electrode may be arranged.

Figure 5:
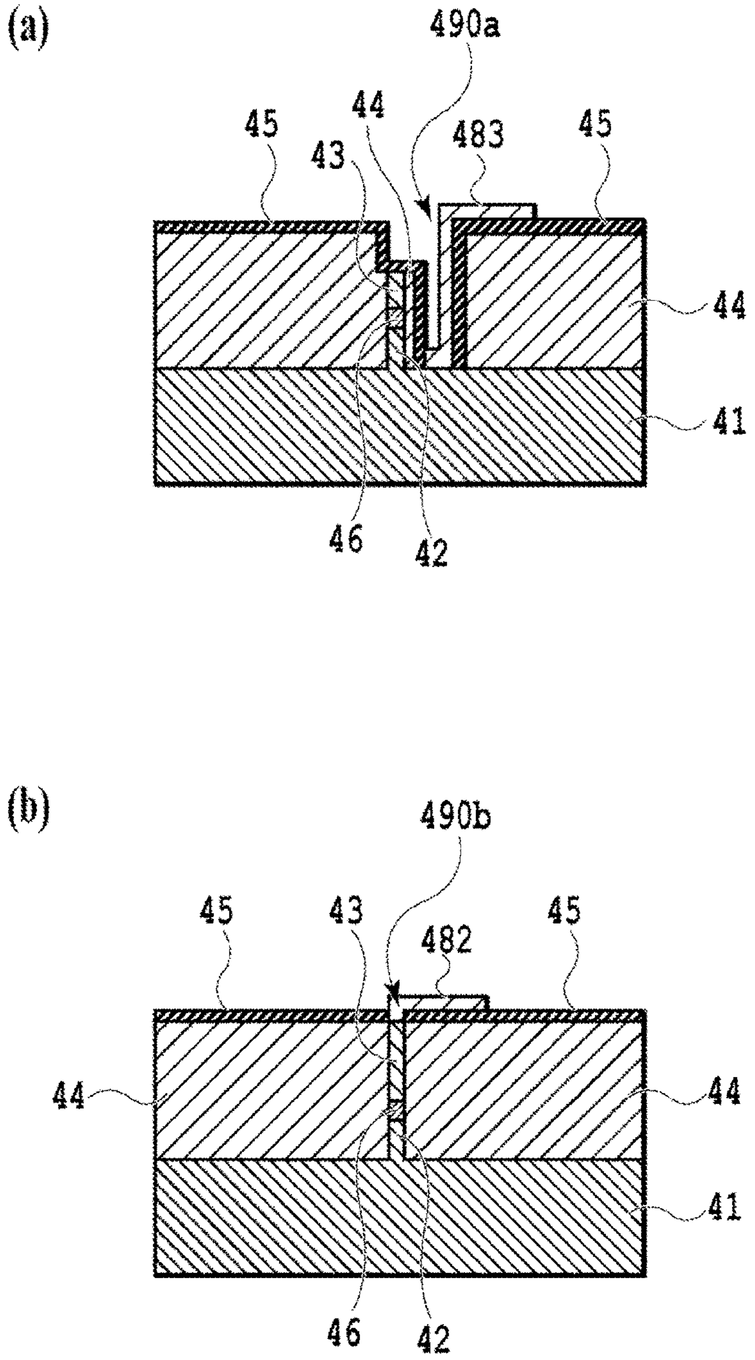
FIG. 5(*a*) is a cross-sectional view taken along a line in FIG. 4, and FIG. 5(*b*) is a cross-sectional view taken along another line illustrated in FIG. 4.
Figure 6:
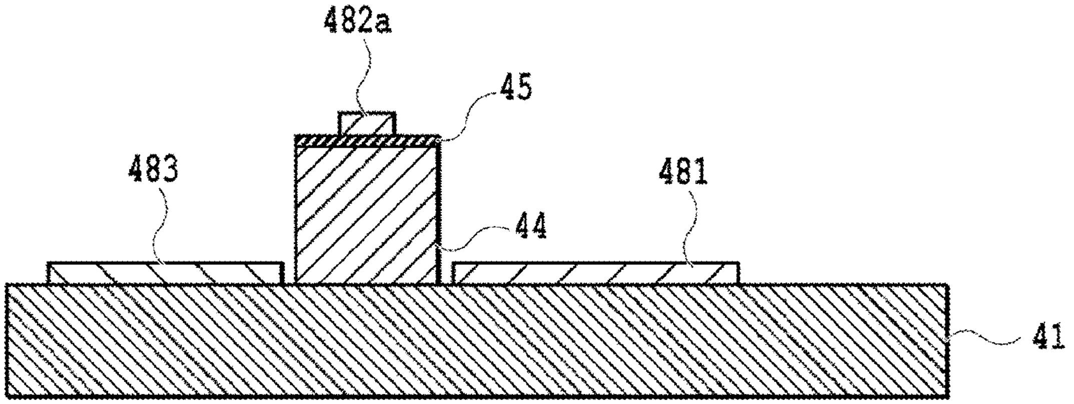
FIG. 6(*a*) is a cross-sectional view taken along a line illustrated in FIG. 4, and FIG. 6(*b*) is a cross-sectional view taken along another line illustrated in FIG. 4.
Figure 6:
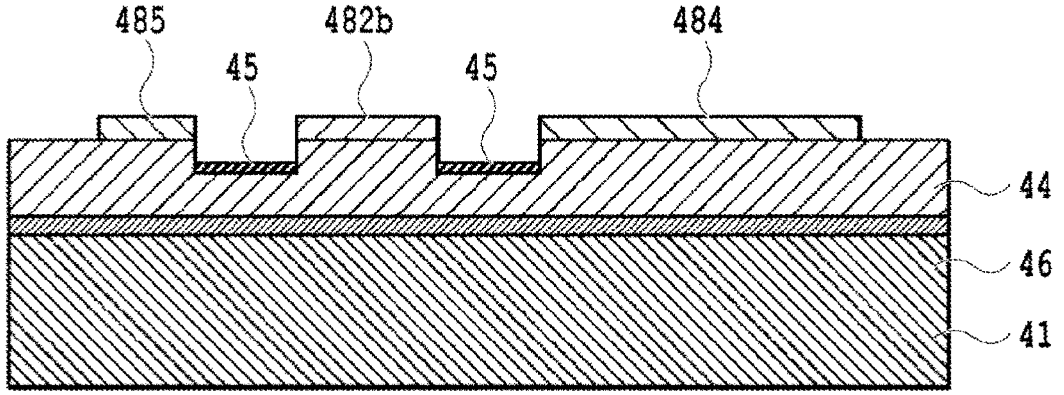

FIG. 5(*a*) is a cross-sectional view taken along lines Va and Va' illustrated in FIG. 4, FIG. 5(*b*) is a cross-sectional view taken along lines Vb and Vb' illustrated in FIG. 4, FIG. 6(*a*) is a cross-sectional view taken along lines VIa and VIa' illustrated in FIG. 4, and FIG. 6(*b*) is a cross-sectional view taken along lines VIb and VIb' illustrated in FIG. 4. The wiring layer 483 extends from the semi-insulating semiconductor layer 44 toward the n-side contact groove 490*a* via the insulating film 45 and is in direct contact with the n-type semiconductor substrate 41. The metal bump 33*d* of the RF connection substrate 3 is connected to the wiring layer 483, and the n-type semiconductor substrate 41 is connected to the lower surface ground portion 34 of the RF connection substrate 3 via the upper surface ground portion 22. The wiring layer 482 is connected to the p-type semiconductor layer 43 connected to the projection 42 of the n-type semiconductor substrate 41 via the active layer 46. Such a wiring layer 482 serves as a p-side electrode of a modulator mounted on the optical modulation light source chip 4.

As described above, the optical modulation light source chip 4 includes, on one surface (upper surface), the wiring layers 481, 483 electrically connected to the n-type semiconductor substrate 41 and connected to the metal bump 33 on the upper surface, and the wiring layer 482 electrically connected to the p-type semiconductor layer 43 and connected to the metal bump 33 on the upper surface. Such a configuration is also referred to as a "single-sided pn electrode type" in the present specification. As described below, the optical transmitter 100 including the single-sided pn electrode type optical modulation light source chip 4 can make a signal path passing through the optical modulation light source chip shorter than a known configuration.

Figure 7:
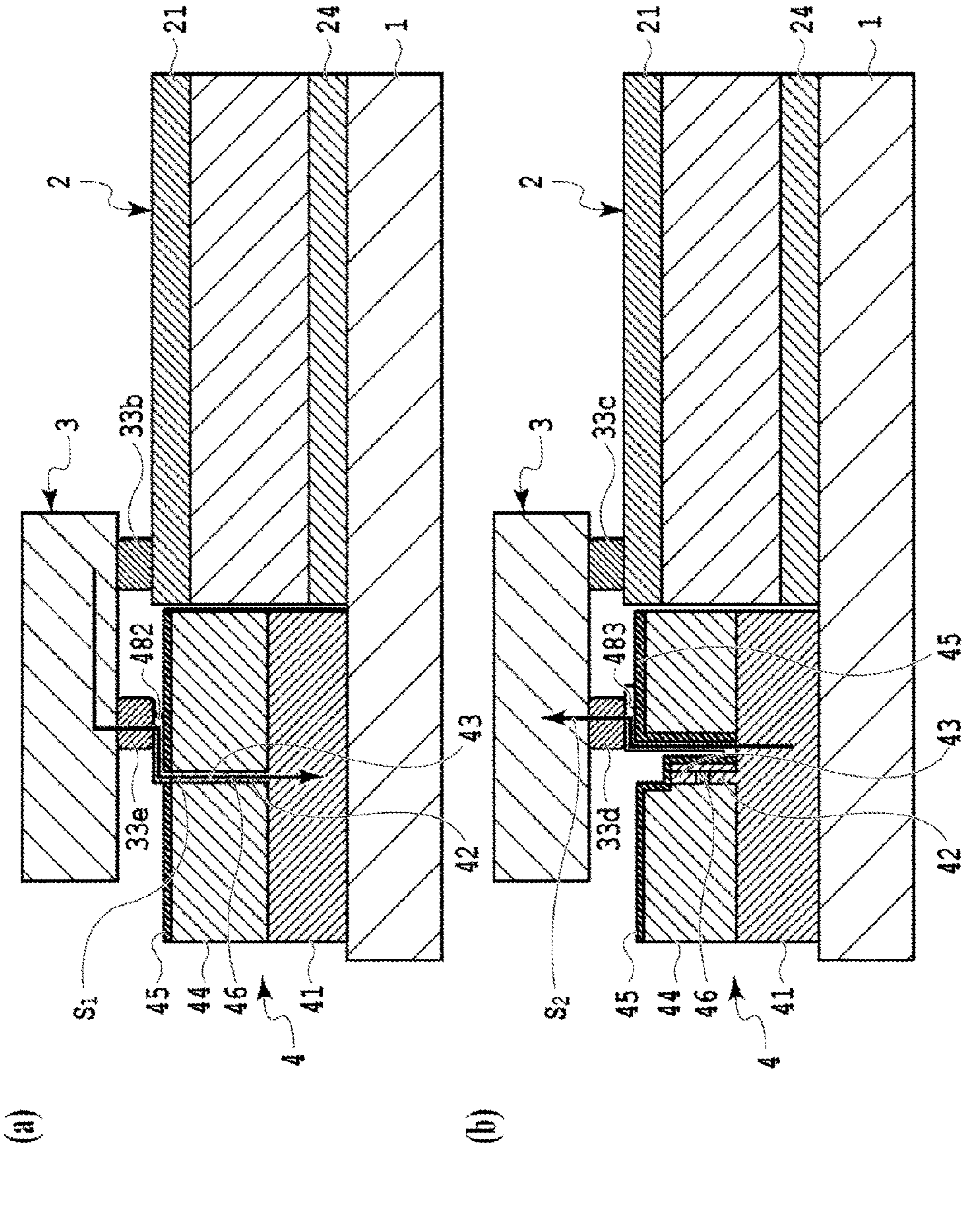
FIG. 7(*a*) is a cross-sectional view of an n-side contact groove, and FIG. 7(*b*) is a cross-sectional view of a p-side contact groove.

FIGS. 7(*a*) and 7(*b*) are schematic cross-sectional views for explaining a signal transmission path in the optical transmitter 100, in which FIG. 7(*a*) is a cross-sectional view along lines Vb and Vb' (FIG. 4) of the optical modulation light source chip 4 connected to the RF wiring substrate 2 and the RF connection substrate 3, and FIG. 7(*b*) is a cross-sectional view along lines Va and Va' (FIG. 4) of the optical modulation light source chip 4 connected to the RF wiring substrate 2 and the RF connection substrate 3. Here, the signal will be described as a current. FIGS. 7(*a*) and 7(*b*) illustrate a path through which a signal is input from the RF wiring substrate 2 to the optical modulation light source chip 4 via the RF connection substrate 3, transmitted in the optical modulation light source chip 4, and output again via the RF connection substrate 3. As illustrated in FIG. 7(*a*), a signal s1 is transmitted from the signal line portion 21 of the RF wiring substrate 2 to the metal bump 33*e* via the RF connection substrate 3 and enters the n-type semiconductor substrate 41 constituting the optical modulator via the p-type semiconductor layer 43, the active layer 46, and the projection 42 of the n-type semiconductor substrate 41. Further, a signal s2 passes through the n-type semiconductor substrate 41, passes through the wiring layer 483 in contact with the n-type semiconductor substrate 41 in the n-side contact groove 490*a* and reaches the lower surface ground portion 34 (FIG. 2(*a*)) of the RF connection substrate 3 from the metal bump 33*d*.

The signal transmission path in the configuration of the first embodiment is about several tens of μm. Thus, in the first embodiment, an electrical path by capacitive coupling from the signal line portion 21 to the lower surface ground portion 34 can be sufficiently shortened with respect to a signal wavelength, so that it is possible to reduce band deterioration. In addition, in this event, as described above, the wiring layers 484, 482, and 485 serving as the p-side electrodes and the wiring layers 481 and 483 serving as the n-side electrodes are arranged so as to be orthogonal to the signal transmission direction (direction indicated by the arrow Ds), so that it is possible to minimize a path of the signal passing through the n-type semiconductor substrate 41. In other words, in the first embodiment, a length of the path through the optical modulation light source chip 4 in the electrical path from the signal line portion 21 to the lower surface ground portion 34 can be minimized. Further, it is possible to reduce deviation from a wavelength of the signal passing through the electric path caused by the capacitive coupling between the signal line portion 32 and the lower surface ground portion 34 lateral to the signal line portion 32 and design a circuit from the signal line portion 21 to the lower surface ground portion 34 through the optical modulation light source chip 4 as a lumped constant circuit.

COMPARATIVE EXAMPLE

Figure 8:
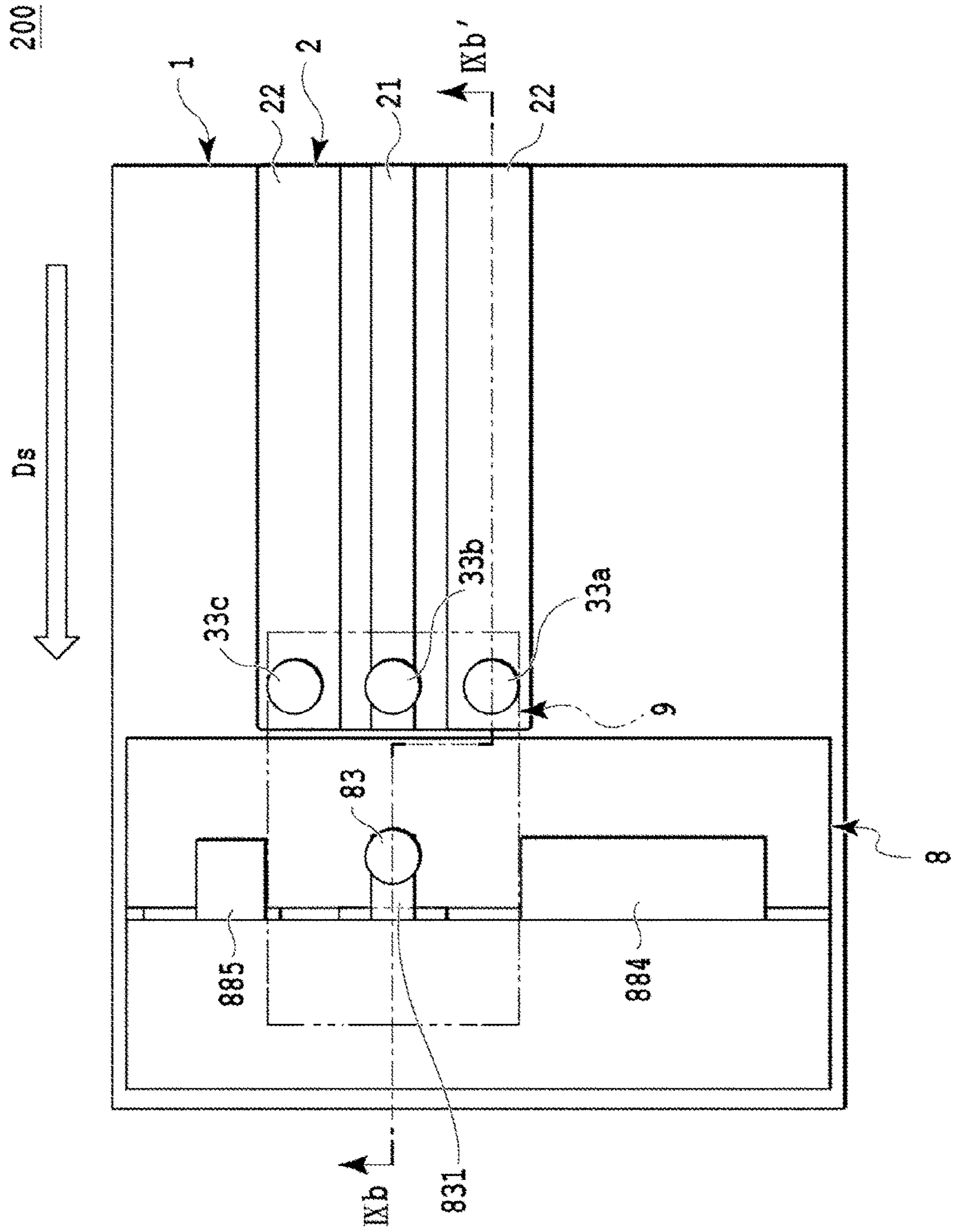
FIG. 8 is a top view of an optical transmitter of a comparative example.
Figure 9:
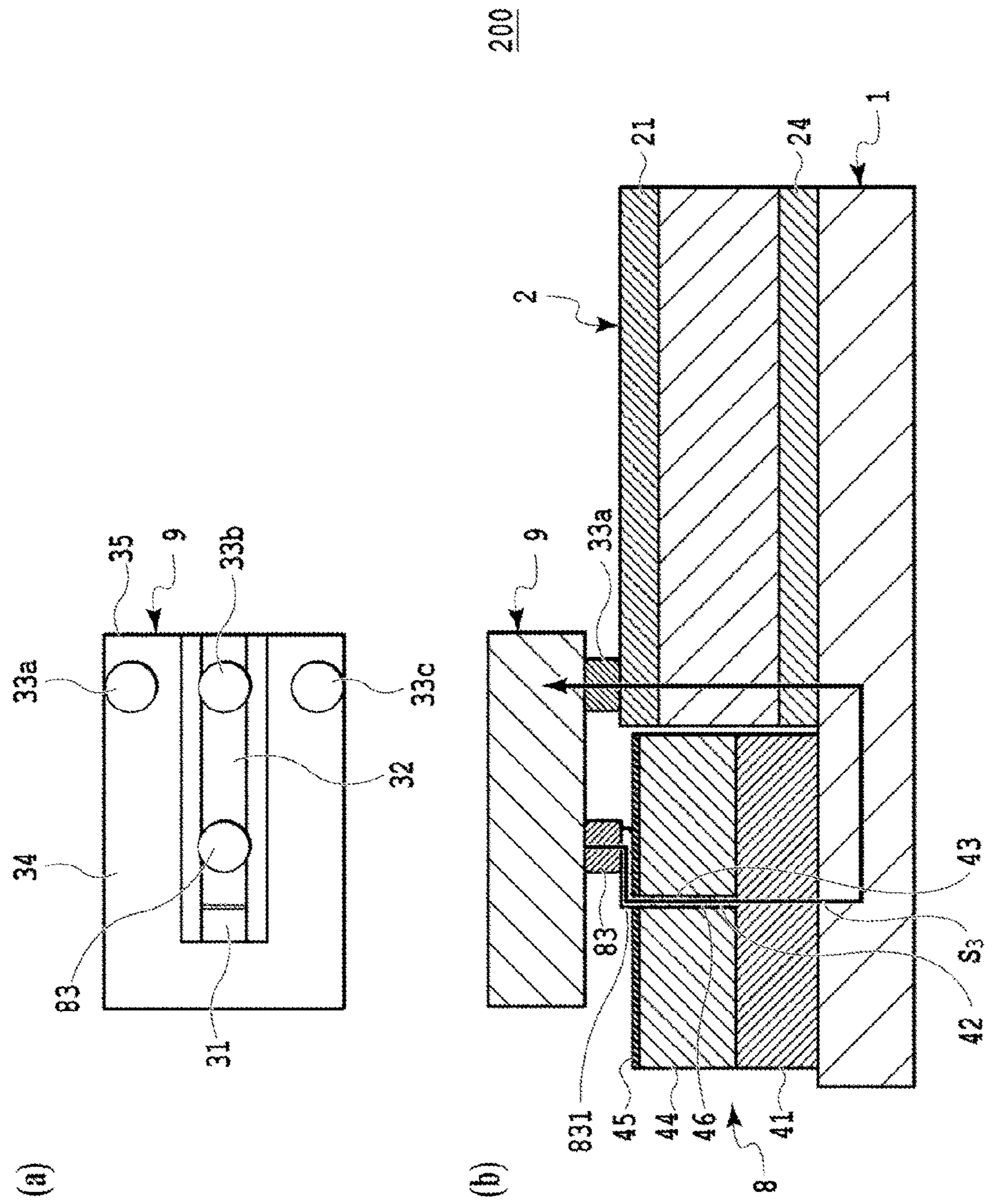
FIG. 9(*a*) is a view illustrating a lower surface of an RF connection substrate illustrated in FIG. 8, and FIG. 9(*b*) is a longitudinal cross-sectional view of the optical transmitter illustrated in FIG. 8.

Here, in order to describe an effect of the optical transmitter 100 of the first embodiment described above, a known optical transmitter 200 will be described. FIGS. 8, 9(*a*), and 9(*b*) are schematic views for explaining a known optical transmitter 200, and FIG. 8 is a top view of the optical transmitter 200. The optical transmitter 200 includes an RF wiring substrate 2, an optical modulation light source chip 8, and an RF connection substrate 9 that connects the RF wiring substrate 2 and the optical modulation light source chip 8. FIG. 9(*a*) is a view illustrating a lower surface of the RF connection substrate 9 in the optical transmitter 200, and FIG. 9(*b*) is a cross-sectional view taken along lines IXb and IXb' in FIG. 8. FIG. 9(*b*) also illustrates a signal transmission path s3.

As illustrated in FIG. 8, the optical modulation light source chip 8 includes wiring layers 881, 884, and 885, and the wiring layers 881, 884, and 885 are p-side electrodes in contact with the p-type semiconductor layer 43. In the known optical transmitter 200, an n-side electrode (not illustrated) is formed on a lower surface of the n-type semiconductor substrate 41 facing the subcarrier 1. As illustrated in FIG. 9(*a*), the RF connection substrate 9 includes four metal bumps 33*a*, 33*b*, and 33*c* and a metal bump 83, the metal bumps 33*b* and 83 are formed on the signal line portion 32, and the metal bumps 33*a* and 33*c* are formed on the lower surface ground portion 34. Even in the known optical transmitter 200, the RF wiring substrate 2 and the optical modulation light source chip 8 are connected by the RF connection substrate 9.

In the known optical modulation light source chip 8, as illustrated in FIG. 9(*b*), a signal input from the RF wiring substrate 2 flows to the wiring layer 831 via the metal bump 83, and flows to the subcarrier 1 via the p-type semiconductor layer 43, the active layer 46, the projection 42, the n-type semiconductor substrate 41, and a ground electrode (not illustrated) on the lower surface of the n-type semiconductor substrate 41. The signal flowing to the subcarrier 1 directly passes through the subcarrier 1, and again flows to the lower surface ground portion 34 of the RF connection substrate 9 via the upper surface ground portion 22 (FIG. 8) of the RF wiring substrate 2 and the metal bump 33*a*. It is apparent that the transmission path s3 of such a signal has a length of about 1 mm from several hundred μm, and a total length of the transmission paths s1 and s2 is about 10 to 100 times longer than several tens of μm in the first embodiment.

In such an optical transmitter 200 of the comparative example, a path from the projection 42 to the metal bump 33*a* is longer than that in the optical transmitter 100, and thus, a path from the signal line portion 21 to the metal bump 33 becomes long to such an extent that it cannot be seen as a lumped constant circuit in a frequency band exceeding 60 GHz. Thus, in the optical transmitter 200 of the comparative example, signal quality of a frequency band exceeding 60 GHz is deteriorated, and it is difficult to use the optical transmitter in signal transmission of 85 Gbit/s. On the other hand, the optical transmitter 100 of the first embodiment solves the problem of the optical transmitter 200 by sufficiently shortening the path of the signal from the optical modulation light source chip 4 to the RF wiring substrate 2 and can implement signal transmission of 85 Gbit/s.

Effects

Figure 10:
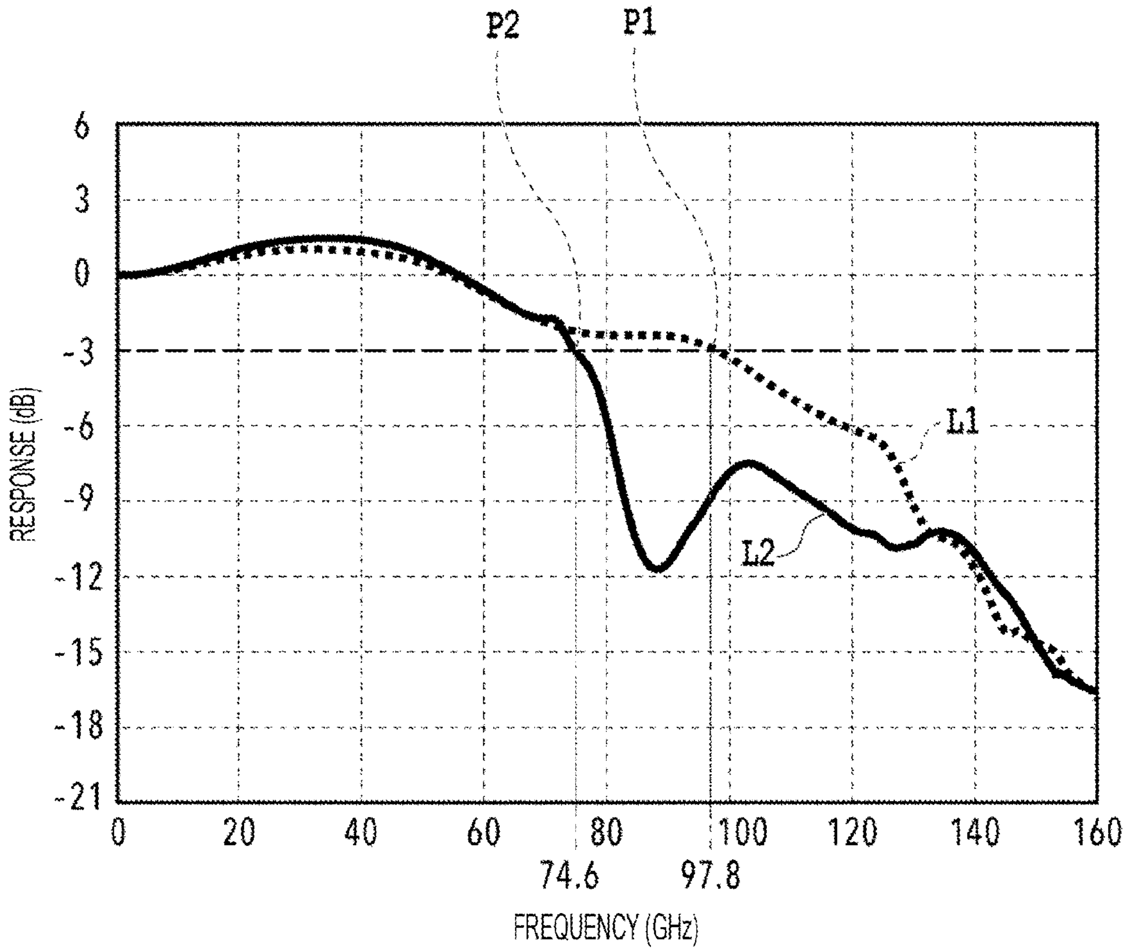
FIG. 10 is a graph for explaining a frequency response of the first embodiment.

Next, effects obtained by the first embodiment described above will be described. FIG. 10 is a graph illustrating a relationship (frequency response) between a frequency (GHz) and a signal response (dB) obtained using a subassembly of the optical transmitter 100 on which the single-sided pn electrode type optical modulation light source chip 4 of the first embodiment is mounted. In FIG. 10, a horizontal axis represents a frequency of an input signal, and a vertical axis represents gain variation of a modulated signal in a normalized manner. The gain was measured by applying a high frequency probe to the RF wiring substrate 2. In addition, the present inventors measured the frequency response with respect to the frequency similarly for the optical transmitter 200 of the comparative example and compared the frequency response with the frequency response of the subassembly of the optical transmitter 100 of the first embodiment. In either of the optical transmitters 100 and 200, the optical modulation light source chip is an electro-absorption (EA) optical modulator integrated laser in which an optical semiconductor modulator is integrated, and an electrode length $L_E$ of the EA optical modulator is 75 μm. In either of the optical transmitters 100 and 200, the metal bump 33 is made of gold, has a diameter of 60 μm, and a height of 30 μm, and connects the RF connection substrate 3, the RF wiring substrate 2, the optical modulation light source chip 4 or the RF connection substrate 9, the RF wiring substrate 2, and the optical modulation light source chip 8.

In FIG. 10, the frequency response of the optical transmitter 100 is indicated by a line L1, and the frequency response of the optical transmitter 200 is indicated by a line L2. A point p1 of the line L1 indicates that the frequency response of the optical transmitter 100 indicated by the line L1 decreases by 3 dB from a maximum value (0), and a wavelength band corresponding to 0 to p1 corresponds to a so-called 3 dB band. Similarly, a point p2 of the line L2 indicates the 3 dB band of the optical transmitter 200 indicated by the line L2. As indicated by the line L2, the frequency response of the optical transmitter 200 of the comparative example was rapidly deteriorated when the frequency became 60 Hz or more, and the 3 dB band became 74.6 GHz. On the other hand, in the optical transmitter 100 of the first embodiment, as indicated by the line L1, even when the frequency became 60 GHz or more, the frequency response was not rapidly deteriorated, and the 3 dB band was 97.8 GH. From such a result, it is clear that the optical transmitter 100 on which the single-sided pn electrode type optical modulation light source chip 4 is mounted can improve the frequency response of the optical transmitter 200 of the comparative example.

Figure 11:
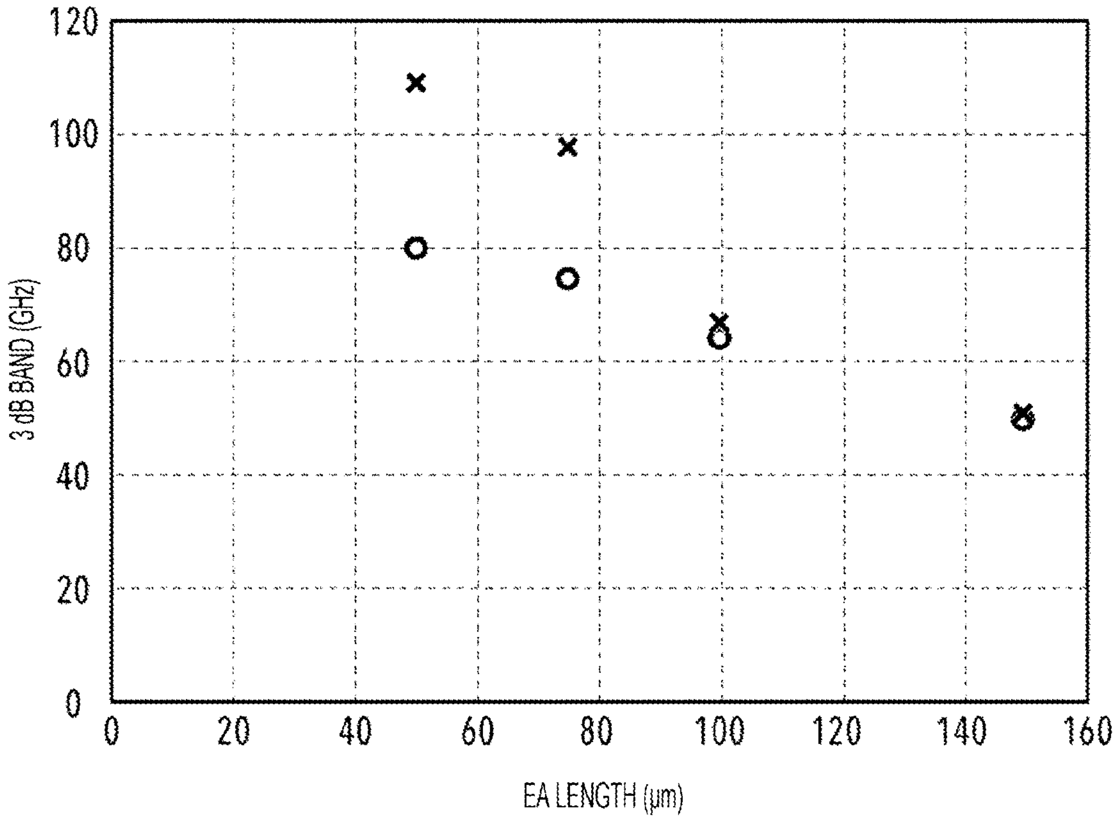
FIG. 11 is a graph for explaining dependency of the optical transmitter of the first embodiment on an electrode length in a 3 dB band.

In addition, the present inventors obtained dependency of the 3 dB band of the optical transmitter 100 on the electrode length $L_E$ and compared the dependency with the dependency in the optical transmitter 200 of the comparative example. In this experiment, three types of optical transmitters 100 and 200 having different electrode lengths $L_E$ of modulators of the optical modulation light source chip were prepared, and 3 dB bands were measured. The electrode lengths $L_E$ are 50 μm, 100 μm, and 150 μm. FIG. 11 is a graph illustrating this result. A plot of "x" indicates the result of the optical transmitter 100, and a plot of "o" (white circle) indicates the result of the optical transmitter 200.

As illustrated in FIG. 11, in a case where the electrode length $L_E$ is 150 μm, the 3 dB bands of the optical transmitters 100 and 200 are substantially the same, but in a case where the electrode length $L_E$ is 100 μm, the 3 dB band of the optical transmitter 100 is slightly longer than that of the optical transmitter 200. In this event, the 3 dB band of the optical transmitter 100 is 66.7 GHz, and the 3 dB band of the optical transmitter 200 is 64.7 GHz. Further, in a case where the electrode length $L_E$ is 50 μm, the 3 dB band of the optical transmitter 100 is 109.1 GHz, and the 3 dB band of the optical transmitter 200 is 79.7 GHz. From such a result, it can be said that the optical transmitter 100 on which the single-sided pn electrode type optical modulation light source chip 4 is mounted can improve the frequency response in a case where the electrode length $L_E$ of the known optical transmitter 200 is 150 μm or less. As described above, the optical transmitter according to the aspect of the present disclosure can improve the band of the frequency response characteristic by shortening the length of the signal path as compared with the known optical transmitter.

Second Embodiment

Figure 12:
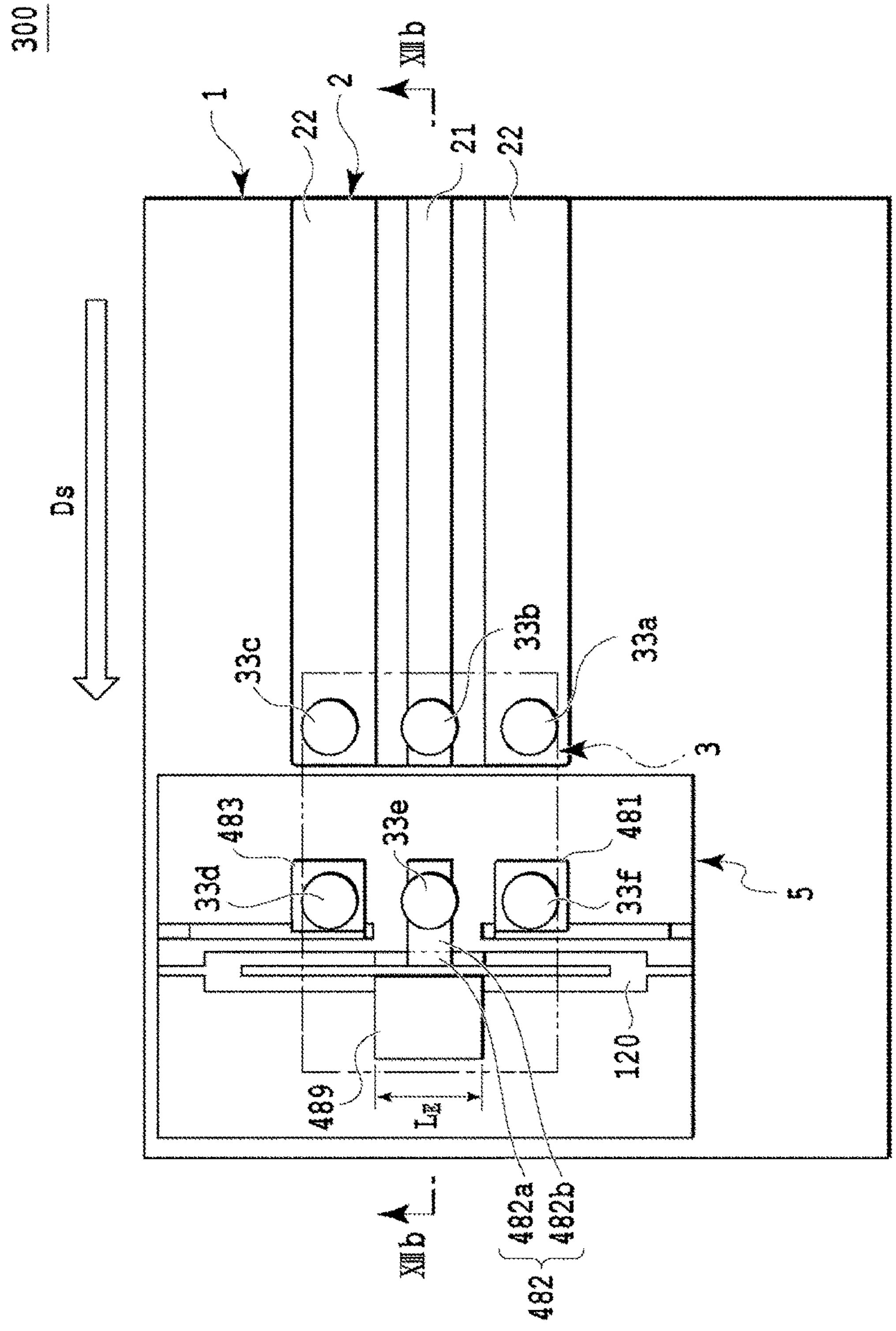
FIG. 12 is a top view of an optical transmitter according to a second embodiment.
Figure 13:
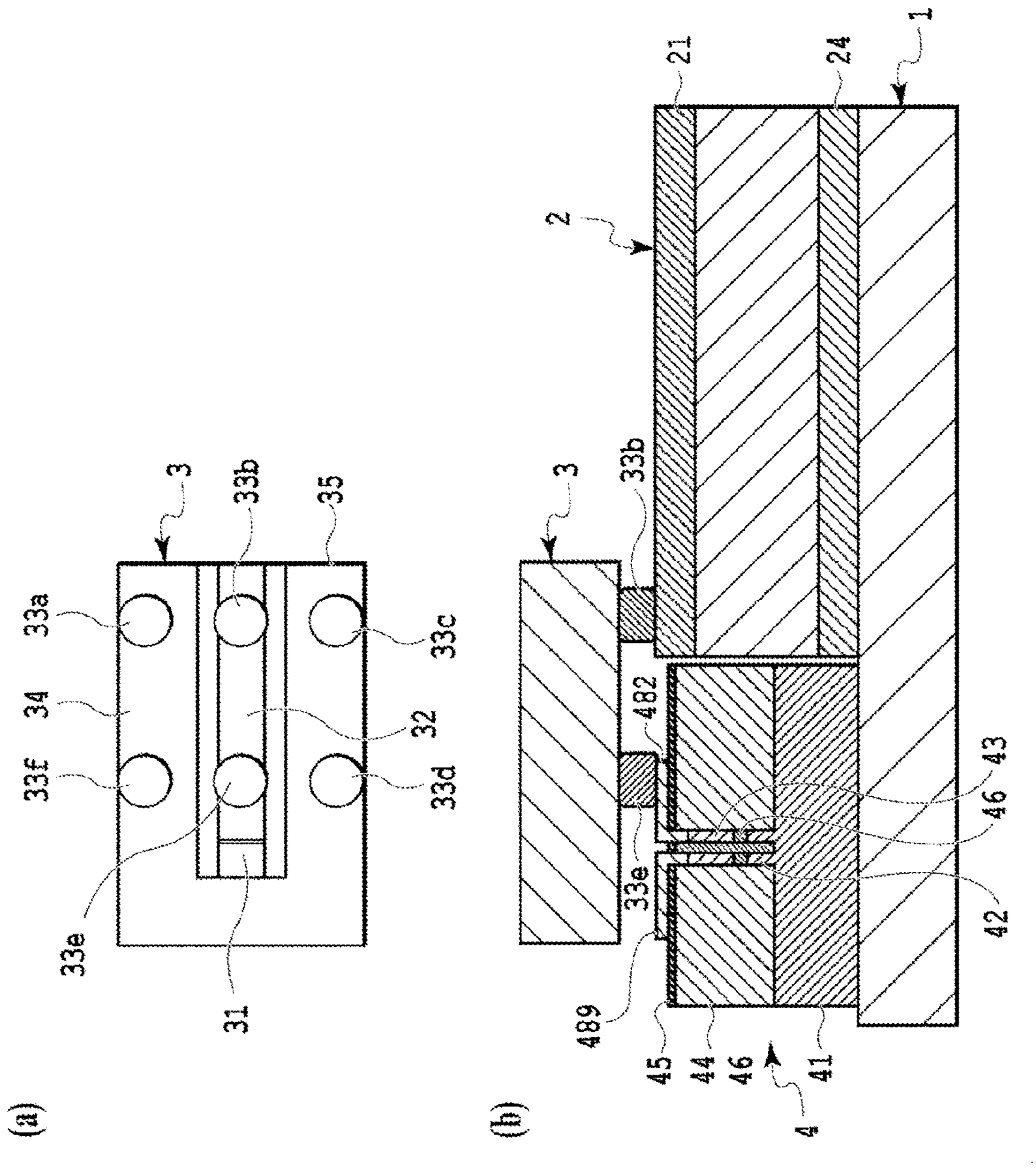
FIG. 13(*a*) is a view illustrating a lower surface of an RF connection substrate illustrated in FIG. 12, and FIG. 13(*b*) is a longitudinal cross-sectional view of the optical transmitter illustrated in FIG. 12.

Next, a second embodiment of the present disclosure will be described. An optical transmitter 300 of the second embodiment is different from that of the first embodiment in that, while the optical transmitter 100 of the first embodiment is an electro-absorption type optical modulator integrated laser, that is, an electro-absorption type optical modulator, in the optical transmitter 300, an optical modulation light source chip 5 of a Mach-Zehnder type optical modulator (MZ modulator) including a Mach-Zehnder interferometer 120 is mounted. FIG. 12 is a top view of the optical transmitter 300, FIG. 13(*a*) is a view illustrating a lower surface of the RF connection substrate illustrated in FIG. 12, and FIG. 13(*b*) is a cross-sectional view taken along lines XIIIb and XIIIb' illustrated in FIG. 12. Also in the optical transmitter 300 of the second embodiment, as illustrated in FIG. 13(*a*), the RF connection substrate 3 includes six metal bumps 33*a* to 33*f*, and the metal bump 33*e* connects the signal line portion 21 of the RF wiring substrate 2 and the wiring layer 482 forming an electrode for inputting a signal to the Mach-Zehnder interferometer 120. Also in the second embodiment, a length of the wiring layer 482 illustrated in FIG. 12 is set as the electrode length $L_E$.

As illustrated in FIG. 13(*b*), the metal bump 33 is connected to the p-type semiconductor layer 43 via the wiring layer 482, and the wiring layer 482 functions as a p-side electrode. Also in the second embodiment, the optical modulation light source chip 5 includes a wiring layer (not illustrated) connected to the n-type semiconductor substrate 41 and extended to the upper surface illustrated in FIG. 12.

Effects

The present inventors manufactured an assembly of the optical transmitter 300 having such a configuration and measured the frequency response using the frequency as a parameter. In addition, the present inventors manufactured an optical transmitter assembly equipped with a MZ modulator (hereinafter, referred to as "MZ modulator of the comparative example") including a p-side electrode on the upper surface and an n-side electrode on the lower surface, measured the frequency response, and compared the results. In the manufacturing of the assembly of the two optical transmitters, the electrode length $L_E$ of the modulator included in the optical modulation light source chip was 100 μm, the metal bump was made of gold, a diameter thereof was 65 μm, and a height thereof was 30 μm.

Figure 14:
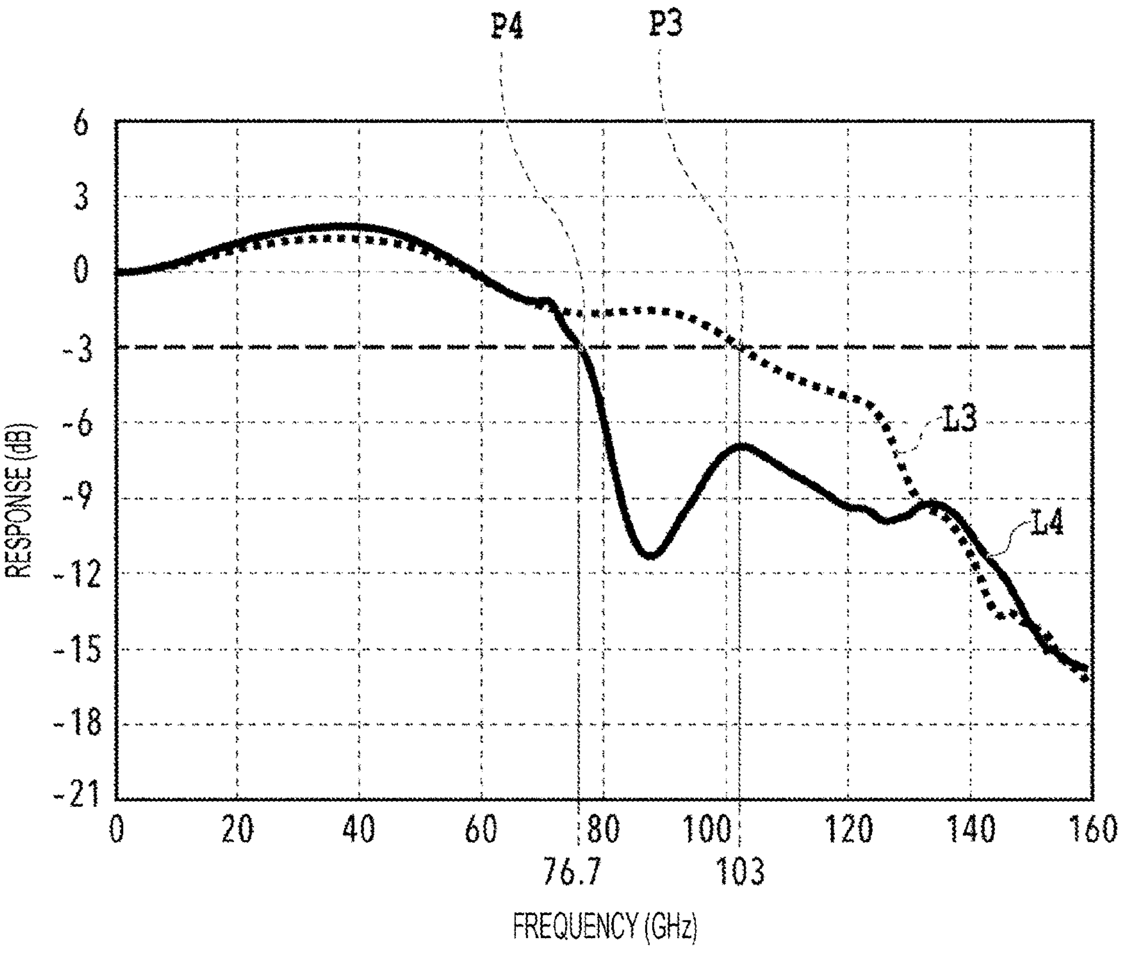
FIG. 14 is a graph for explaining a frequency response of the second embodiment.

FIG. 14 is a graph illustrating a frequency response obtained using a subassembly of the optical transmitter 300 on which the single-sided pn electrode type optical modulation light source chip 5 of the second embodiment is mounted and an assembly of the optical transmitter on which the MZ modulator of the comparative example is mounted. In FIG. 14, a horizontal axis represents a frequency of an input signal, and a vertical axis represents gain variation of a modulated signal in a normalized manner. In FIG. 14, the frequency response of the optical transmitter 300 is indicated by a line L3, and the frequency response of the optical transmitter equipped with the MZ modulator of the comparative example is indicated by a line L4. A point p3 of the line L3 indicates a 3 dB band of the optical transmitter 300, and a point p4 of the line L4 indicates a 3 dB band of the optical transmitter equipped with the MZ modulator of the comparative example. As illustrated in FIG. 14, in a frequency range of 70 Hz or more, a response of the optical transmitter equipped with the MZ modulator of the comparative example is rapidly deteriorated, and the 3 dB band becomes 76.7 GHz. On the other hand, a response signal of the optical transmitter 300 of the second embodiment is not deteriorated even after 70 GHz, and the 3 dB band becomes 103 GHz. It can be seen from this that in the second embodiment, the frequency response can be improved by designing the optical modulation light source chip in the single-sided pn type even in the optical transmitter including the MZ modulator.

Figure 15:
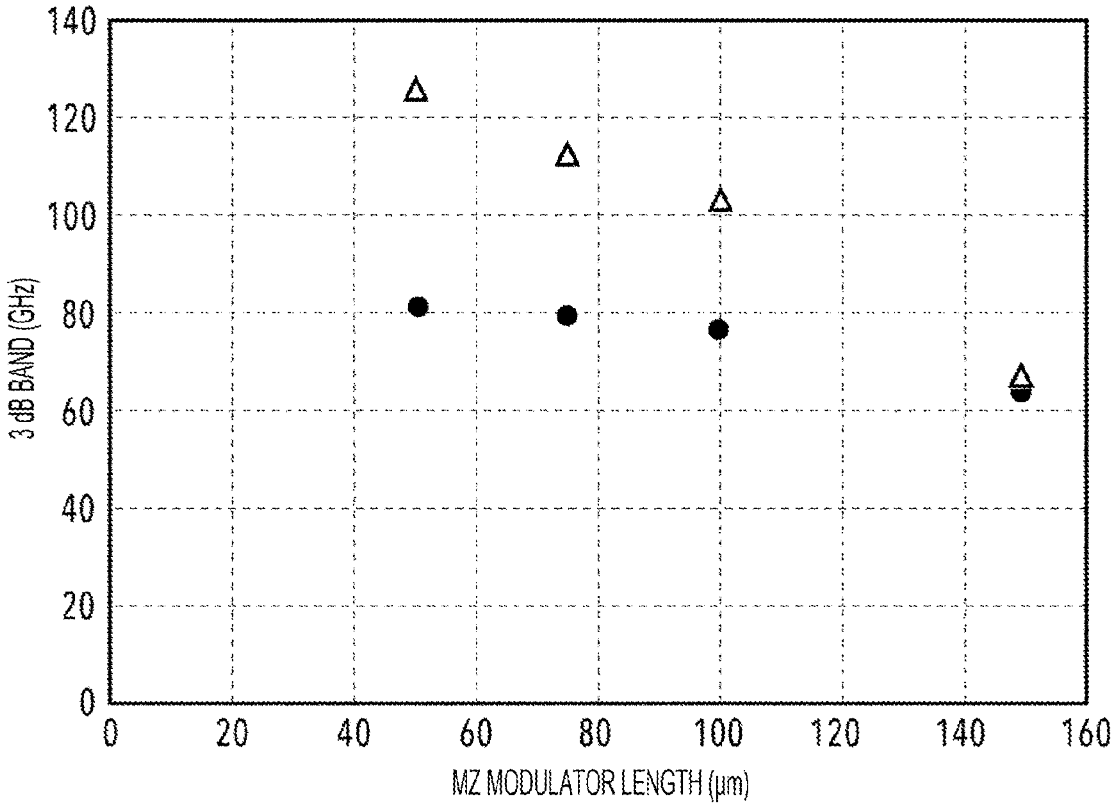
FIG. 15 is a graph for explaining dependency of an optical transmitter of the second embodiment on an electrode length in a 3 dB band.

In addition, the inventors of the present disclosure obtained dependency of the 3 dB band of the optical transmitter 300 on the electrode length $L_E$ and compared the dependency with the dependency in the optical transmitter equipped with the MS modulator of the comparative example. In this experiment, similarly to the first embodiment, three types of optical transmitters 300 having different electrode lengths $L_E$ of modulators of the optical modulation light source chip and an optical transmitter equipped with the MZ modulator of the comparative example were manufactured, and 3 dB bands were measured. The electrode lengths $L_E$ are 50 μm, 75 μm, 100 μm, and 150 μm. FIG. 15 is a graph illustrating this result, where a plot of "Δ" indicates the result of the optical transmitter 300, and a plot of "●" (black circle) indicates the result of the optical transmitter equipped with the MZ modulator of the comparative example. As illustrated in FIG. 15, in a case where the electrode length $L_E$ is 150 μm, the 3 dB band of the optical transmitter 300 is 66.9 GHz, and the 3 dB band of the optical transmitter including the MZ modulator of the comparative example is 64 GHz.

Further, according to FIG. 15, in a case where the electrode length $L_E$ is 75 μm, the 3 dB band of the optical transmitter 300 is 111.3 GHz, whereas the 3 dB band of the optical transmitter equipped with the MZ modulator of the comparative example is 79.3 GHz. Further, in a case where the electrode length $L_E$ is 50 μm, the 3 dB band of the optical transmitter 300 is 125.3 GHz, whereas the 3 dB band of the optical transmitter equipped with the MZ modulator of the comparative example is 81.5 GHz. From such a result, it can be said that according to the second embodiment, it is possible to improve frequency response of the optical transmitter including a Mach-Zehnder type optical modulator and having the electrode length $L_E$ of 150 μm or less.

Aspects of the present disclosure are not limited to the embodiments described above. In other words, although in the aspects of the present disclosure, examples of the RF connection substrate of the grounded coplanar waveguide have been described, the waveguide is not limited to the grounded coplanar waveguide, and may be, for example, a coplanar waveguide having no ground portion on the back surface. Further, in the aspects of the present disclosure, examples of the electro-absorption type optical modulator and the Mach-Zehnder interference type optical modulator have been described as the optical modulation light source chip, but the present disclosure is not limited to such a configuration, and for example, a direct modulation laser that directly modulates a semiconductor laser as a light source may be used. An optical modulation module such as an optical modulation light source chip used in the optical transmitter according to the aspect of the present disclosure preferably has a 3 dB band of 60 GHz or more.

Furthermore, the first embodiment and the second embodiment described above are not limited to the configuration in which the first type is the n-type and the second type is the p-type as described above, and the first type may be the p-type and the second type may be the n-type as long as the function of optical modulation is performed. Thus, in the first embodiment, the signal line portion 21 of the RF wiring substrate 2 may be connected to the p-side electrode of the optical modulation light source chip 4 or may be connected to the n-side electrode. In the first embodiment, the upper surface ground portion 22 of the RF wiring substrate 2 may be connected to the p-side electrode of the optical modulation light source chip 4 or may be connected to the n-side electrode.

REFERENCE SIGNS LIST

1 Subcarrier
2 Wiring substrate
3, 9 Connection substrate
4, 5, 8 Optical modulation light source chip
21 Signal line portion
22 Upper surface ground portion
24, 34 Lower surface ground portion
31 Termination resistor
32 Signal line portion
33, 83 Metal bump
41 n-type semiconductor substrate
42 Projection
43 p-type semiconductor layer
44 Semi-insulating semiconductor layer
Insulating film
46 Active layer
100, 200, 300 Optical transmitter
464, 481, 482, 483, 484, 485, 881, 884, 885 Wiring layer
490*a* n-side contact groove
490*b* p-side contact groove
$L_E$ Electrode length

The invention claimed is:

1. An optical modulation module having a first main surface and a second main surface facing the first main surface and connected to a wiring substrate by a connection substrate on a side of the first main surface, the optical modulation module comprising:

a first-type semiconductor layer into which an impurity of a first polarity is injected;

a second-type semiconductor layer into which an impurity having a second polarity different from the first polarity is injected;

a first wiring layer electrically connected to the first-type semiconductor layer and electrically connected to a terminal of the connection substrate on the first main surface; and a second wiring layer electrically connected to the second-type semiconductor layer and in contact with the terminal on the first main surface, wherein a signal passing through the optical modulation module is transmitted in a transmission direction, and the first wiring layer and the second wiring layer are arranged in a direction intersecting with the transmission direction on the first main surface.

2. An optical transmitter comprising:

an optical modulation module having a first main surface and a second main surface facing the first main surface, the optical modulation module being connected to a wiring substrate by a connection substrate on a side of the first main surface, the optical modulation module comprising:

a first-type semiconductor layer into which an impurity of a first polarity is injected;

a second-type semiconductor layer into which an impurity having a second polarity different from the first polarity is injected;

a first wiring layer electrically connected to the first-type semiconductor layer and electrically connected to a terminal of the connection substrate on the first main surface; and a second wiring layer electrically connected to the second-type semiconductor layer and in contact with the terminal on the first main surface;

a the wiring connection substrate disposed on a-the side of the first main surface of the optical modulation module; and the connection substrate having a terminal that electrically connects the optical modulation module and the wiring substrate, wherein a signal passing through the optical modulation module is transmitted in a transmission direction, and the first wiring layer and the second wiring layer are arranged in a direction intersecting with the transmission direction on the first main surface.

3. The optical transmitter according to claim 2, wherein a plurality of at least one of the first wiring layer and the second wiring layer is disposed on the first main surface, and the first wiring layer and the second wiring layer are adjacent to each other and alternately disposed on the first main surface.

4. The optical transmitter according to claim 2, wherein on the first main surface, the first wiring layer serves as a ground electrode of the optical modulation module, and the second wiring layer serves as an input electrode for inputting a signal from the wiring substrate via the connection substrate.

5. The optical transmitter according to claim 2, wherein on the first main surface, the first wiring layer is arranged with the second wiring layer put therebetween in a direction of the first main surface.

6. The optical transmitter according to claim 2, wherein the connection substrate is a high frequency substrate, and is a coplanar waveguide or a grounded waveguide including a plate-like substrate body and a signal line formed on a surface of the substrate body.

7. The optical transmitter according to claim 2, wherein the optical modulation module has a modulation electrode that is at least one of an electro-absorption type optical modulator, a Mach-Zehnder interference type optical modulator or a direct modulation laser and has a length of 150 μm or less.

* * * * *